July 31, 1928.

J. CHURCHWARD

VULCANIZING PAN

Filed Sept. 22, 1925

1,679,114

INVENTOR

Jack Churchward,

By J. Amos Johnson

Att'y.

Patented July 31, 1928.

1,679,114

UNITED STATES PATENT OFFICE.

JACK CHURCHWARD, OF NEW HAVEN, CONNECTICUT.

VULCANIZING PAN.

Application filed September 22, 1925. Serial No. 57,845.

My invention relates especially to vulcanizing pans for rubber covered wire. The necessities of the art have developed an annular or ring-shaped form of pan, which is practically of universal use, to hold the coil of wire while the coating of rubber is being vulcanized on it. A pan of the shape which is needed for this work, if made of one piece of metal, of the sizes which are ordinarily required, would involve costs that would be prohibitive. It is customary, therefore, to build the pans up from pieces of sheet metal, using a ring-shaped bottom with a circular inner and a circular outer side wall.

It has, hitherto, been almost impossible to get a satisfactory pan, when built up in this manner. The rough usage to which they are subjected—the heavy loads which are put into them—together with the corrosive action of the chemicals on them during the vulcanizing process, has made it necessary to mend them or renew them at frequent intervals.

Figure 1:
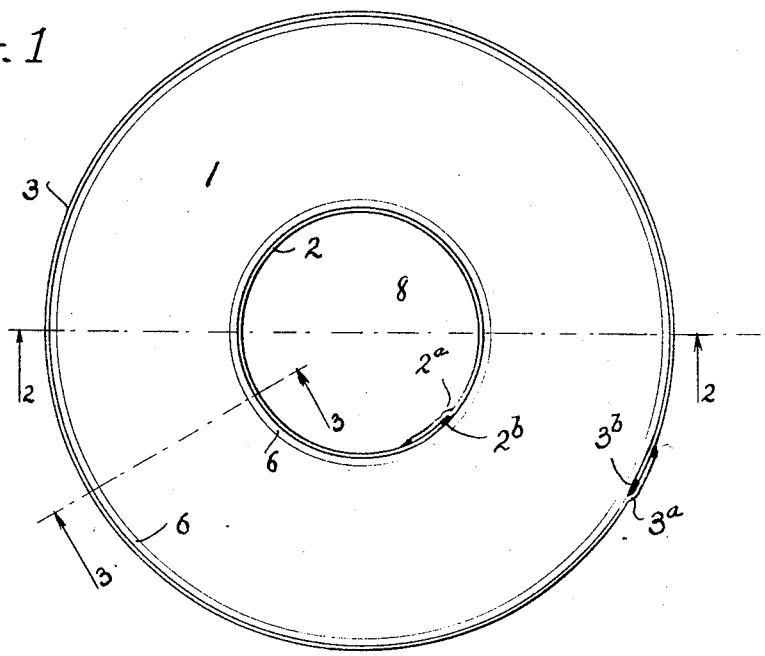
Figure 2:
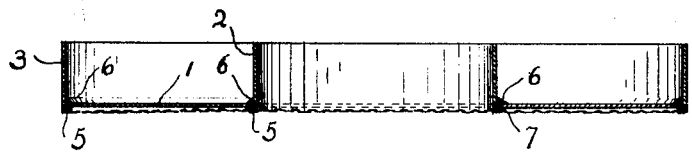
Figure 3:
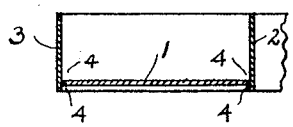

I have been able to produce a pan which, while not absolutely indestructible, is very much more durable and satisfactory in every way and, at the same time, I have materially reduced the cost of their manufacture. I accomplish this result by using a new material which is especially suitable to resist the corrosive action of the vulcanizing process and by using a particular form of construction with a fixed sequence of operations in putting the parts together, as will be explained in the description which follows, reference being made to the accompanying sheet of drawings, in which: Figure 1 is a plan; Fig. 2 is a sectional elevation on the line 2—2 of Fig. 1 and Fig. 3 is a cross section on the line 3—3 of Fig. 1, before the parts have been welded together.

In forming my improved vulcanizing pan I use sheet metal of a thickness which, in general, bears some relation to the diameter and depth of the pan—the smaller, lighter pans being made of thinner metal than the larger, heavier pans. I have discovered that copper alloy steel, having approximately a three tenths of one per cent content of copper, is most admirably adaptable for this particular work. This material can be obtained readily, in sheets of any desired size and thickness. It is strong, easily workable—can be readily welded and it is rust-resisting to a very high degree.

As herein described and illustrated, the pan consists of three pieces: a bottom 1, an inner side wall 2 and an outer side wall 3—the sides being double electric welded to the bottom. The parts are brought together as shown in Fig. 3, with the bottom slightly raised above the lower edges of the side walls, leaving two upper inside and two lower outside corners 4, to hold the welding material. The parts are held in this position by any convenient means and "tacked"—that is, welded in a few places—enough to hold the parts together. Welding is done by the electric current and fillets of welding material deposited in the corners 4. No other form of joining the edges is as well suited for the purpose. Brazing, acetylene welding and the like warp the sheet metal and an unsatisfactory job is the result.

The seams on the outside, under the bottom, are welded first, as it is impossible to get a smooth first weld and roughness on the outside does no harm. The welding material unites with the projecting edges of the side walls to form two circular ridges 5, on the under side of the bottom, on which the pan rests and which serves to protect the bottom from injury.

The seams are next welded on the inside and fillets 6, can be laid in quite smoothly. The outside and inside welds unite to form a homogeneous mass 7,—the thickness through the two welds being about twice the thickness of the sheet metal, in order to give the necessary strength and rigidity to the pan.

The inner side wall 2, is formed of a strip of metal which is bent into circular form and made to fit the inner opening 8, in the bottom, as tightly as possible. Where the ends come together they overlap and one end is offset as shown at $2^a$ and a pocket or channel $2^b$ is welded full. The outside wall is of exactly the same construction, only reversed, the corresponding parts being marked $3^a$ and $3^b$ in the drawings. The two welded-in pockets are put on the inside of the pan so as to leave a smooth, unbroken surface for the wire to come against as the pans are filled for vulcanizing.

The bottom of the pan wears out first. It has to sustain the whole load and it is the first to corrode, as any erosive liquid which finds its way into the pan naturally comes in contact with this part. Substantially all the improvements claimed for this pan can be maintained and the cost of manufacture still further reduced by making the bottom of the pan of the rust-resisting steel and the side walls of a cheaper grade of sheet metal; or, it can all be made of rust-resisting steel, with the bottom considerably thicker than the side walls.

I do not wish to limit myself to the use of steel with the exact copper content hereinbefore mentioned. Steel with that amount of copper has been found to work admirably and it is readily obtainable.

I claim:

In construction for vulcanizing pans for rubber-covered wire or the like, in combination, a circular outer side wall of sheet metal, a circular inner side wall of sheet metal, an annular sheet metal bottom member extending between said side walls, the bottom edge portions of said side walls projecting below the level of said bottom member, the edges of said bottom member being secured to said side walls by welding on the bottom of the pan in the angle between the under surface of said bottom member and the inner sides of said downwardly projecting portions of the side walls and by welding also on the inner side of the pan in the angle between the upper surface of said bottom member and the inner surfaces of said side walls, said outer welding providing downwardly projecting ridges adapted to support the pan and hold said bottom member away from a surface upon which the pan rests, said inner welding providing smooth fillets on the interior of the pan bottom.

In testimony whereof I affix my signature.

JACK CHURCHWARD.